United States Patent
McCoy

(10) Patent No.: US 8,220,579 B2
(45) Date of Patent: *Jul. 17, 2012

(54) SEATBELT USE PROMOTION SYSTEM AND METHOD

(75) Inventor: Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/698,613

(22) Filed: Feb. 2, 2010

(65) Prior Publication Data

US 2011/0186374 A1    Aug. 4, 2011

(51) Int. Cl.
*B60R 22/48* (2006.01)
(52) U.S. Cl. .......... 180/268; 340/457.1; 180/271
(58) Field of Classification Search ............ 180/268, 180/271, 286; 701/36, 45; 340/457.1
See application file for complete search history.

(56) References Cited

U.S. PATENT DOCUMENTS

| 4,565,991 | A  * | 1/1986  | Lupoli et al. ............... 340/438 |
| 4,673,195 | A  * | 6/1987  | Boyd et al. ............... 280/801.1 |
| 4,758,020 | A  * | 7/1988  | Boyd ...................... 280/801.1 |
| 5,394,955 | A    | 3/1995  | Howard |
| 5,483,221 | A    | 1/1996  | Mutter et al. |
| 5,656,994 | A  * | 8/1997  | Heninger .................. 340/457.1 |
| 6,215,395 | B1 * | 4/2001  | Slaughter et al. .......... 340/457.1 |
| 6,278,358 | B1   | 8/2001  | Spoto et al. |
| 6,278,360 | B1 * | 8/2001  | Yanagi ....................... 340/436 |
| 6,362,734 | B1   | 3/2002  | McQuade et al. |
| 6,501,374 | B1   | 12/2002 | King et al. |
| 6,750,764 | B1 * | 6/2004  | Henninger ................. 340/457.1 |
| 6,992,571 | B2 * | 1/2006  | Ota et al. ................... 340/407.1 |
| 7,061,375 | B2   | 6/2006  | Koike et al. |
| 7,145,448 | B2   | 12/2006 | Tanaka et al. |
| 7,173,522 | B2   | 2/2007  | Inoue |
| 7,426,429 | B2   | 9/2008  | Tabe |
| 7,817,027 | B2 * | 10/2010 | McCoy ..................... 340/457.1 |
| 2004/0117217 | A1 * | 6/2004 | Reber et al. ................... 705/4 |
| 2004/0124974 | A1 * | 7/2004 | Ota et al. ................. 340/457.1 |
| 2006/0108167 | A1   | 5/2006 | Finger |
| 2007/0105444 | A1 * | 5/2007 | Macholz ..................... 439/610 |
| 2008/0013752 | A1 * | 1/2008 | Stephens ..................... 381/103 |
| 2009/0009313 | A1 * | 1/2009 | Pippins, Sr. .............. 340/457.1 |
| 2009/0062990 | A1 * | 3/2009 | Materna et al. ................ 701/48 |
| 2009/0121859 | A1 * | 5/2009 | McCoy ..................... 340/457.1 |
| 2009/0312914 | A1 * | 12/2009 | Miller et al. .................. 701/45 |
| 2011/0082625 | A1 * | 4/2011 | Miller et al. .................. 701/45 |
| 2011/0093165 | A1 * | 4/2011 | Miller et al. .................. 701/36 |

FOREIGN PATENT DOCUMENTS

JP    61200047 A    9/1986

OTHER PUBLICATIONS

SBR, Seat Belt Reminder, http://www.iee.lu/pdf/EN/products/sbr.pdf, , pp. 1-4.

* cited by examiner

*Primary Examiner* — Drew Brown
*Assistant Examiner* — Barry Gooden, Jr.
(74) *Attorney, Agent, or Firm* — Frank A. MacKenzie; Brooks Kushman P.C.

(57) ABSTRACT

Seatbelt use is promoted by determining whether a seat is occupied and then determining whether the seatbelt associated with the seat is buckled. When the seat is occupied and unbuckled, user control of an entertainment system associated with the seat is overridden. In video-equipped entertainment systems, a video encouraging seatbelt use can be played, such as an informational video. When the seatbelt is latched, a reward audio or video clip may be played prior to allowing user control of the entertainment system.

17 Claims, 3 Drawing Sheets

SEATBELT USE PROMOTION SYSTEM AND METHOD

BACKGROUND

1. Technical Field

This disclosure relates to seatbelt monitoring systems and measures to promote seatbelt usage when non-usage is determined.

2. Background Art

Passenger restraint systems, such as seatbelts, require manual engagement or buckling. The buckled state of seatbelts can be electronically monitored and reminder signals can be provided when it is determined that a seat is occupied, but the seatbelt is not buckled. In some known systems, such as U.S. Pat. No. 6,278,358 assigned to the assignee of the present disclosure, an audible and/or visible indicator alerts a vehicle occupant of the unbuckled condition of the seatbelt. The system directs the visual status messages only to the vehicle operator. The operator of the vehicle is unable to buckle seatbelts for others while in the process of operating the vehicle, particularly for second and third row occupants. Even in the case of occupants who are physically capable, but haven't buckled, at the very least it is distracting to the operator of the vehicle to provide instructions and/or to cajole the unbuckled passenger to take the necessary steps to buckle their seatbelt.

In one system, the control unit may mute the CD player or may limit functionality of the entertainment unit if the seatbelt of an occupied seat unit becomes unfastened. Such limited functionality of the entertainment unit is performed to encourage seat belt usage. However, simply limiting functionality might not be sufficient to get the attention of the passenger(s) with an unbuckled belt. Furthermore, in situations where the entertainment center is a CD player that is shared among the entire vehicle, simply limiting functionality is not targeted to indicate why the entertainment center is not responding as expected nor is the action taken targeted to indicate which passenger(s) is causing the limited functionality.

SUMMARY

A method to encourage seatbelt use includes: determining whether a first seat is occupied; determining whether a child safety seat is being used or determining the size of the seat occupant in the first seat; determining whether a first seatbelt associated with the first seat is buckled; determining whether a second seat is occupied; determining whether a child safety seat is being used or determining the size of the seat occupant in the second seat; determining whether a second seatbelt associated with the second seat is buckled; and overriding user-controlled operation of an entertainment system associated with the first and second seats when at least one the first seat is occupied and the first seatbelt is unbuckled or the second seat is occupied and the second seatbelt is unbuckled. Overriding can comprise disabling the entertainment system.

In another embodiment, a method to encourage seatbelt use includes: determining whether a seat is occupied; determining whether a seatbelt associated with the seat is buckled; and overriding user-controlled operation of an entertainment system associated with the seat when the seat is occupied and the seatbelt is unbuckled. In some embodiments, the entertainment system is installed in an automotive vehicle and the overriding operation of the entertainment system is further based on the automotive vehicle traveling above a predetermined threshold speed. In other embodiments, the overriding is further based on an ignition of the automotive vehicle being in an on position.

Control of the entertainment system is allowed when it has been determined that seatbelts in occupied seats associated with the entertainment system are buckled.

In some embodiments, the entertainment system allows input from a user-provided electronic device, in which case, the overriding includes disallowing output from the portable, user-provided electronic device from displaying on the video display. In some embodiments, the entertainment system is deemed to be associated with the seat when a person occupying the seat is able to benefit from the entertainment system, which can mean able to view the entertainment system when it includes a video display device.

A system to promote seatbelt use includes: a seat having an associated seatbelt and an occupancy presence and size sensor; an entertainment device coupled to the vehicle and associated with the seat; and an electronic control unit (ECU) electronically coupled to the sensor, the seatbelt, and the entertainment device. The ECU disables the entertainment device when the ECU determines that an occupant is in the seat and the seatbelt is unbuckled.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
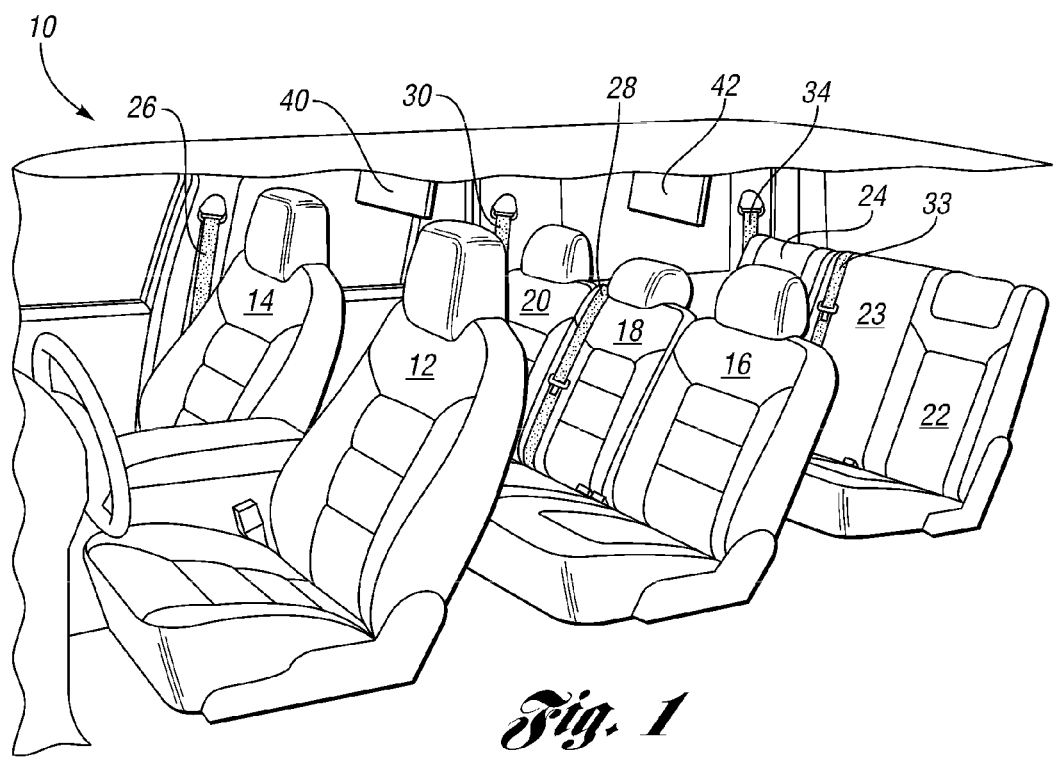
FIG. 1 shows an interior of an automotive vehicle with three rows of seats and two video displays suspended from the roof of the vehicle.

In FIG. 1, an interior of vehicle 10 is shown which includes driver seat 12, passenger seat 14, second row seats 16, 18, and 20, and third row seats 22, 23, and 24. Seatbelts are provided for all seats; however, only seatbelts 26, 28, 30, 33, and 34, which are provided for seats 14, 18, 20, 23, and 24, respectively, are visible in FIG. 1. Suspended from a roof (not shown) of vehicle 10 are first and second video display devices 40 and 42, respectively, which are at least part of an entertainment system integrated onboard vehicle 10. In one embodiment, first and second video display devices, 40 and 42, include a speaker, an audio jack into which headphones can be plugged, and input ports for accepting input from a portable, user-controlled electronic device. The electronic device can be a DVD player, a computer, a game system, a CD player, an internet connection, a MP3 player, etc.

Figure 2:
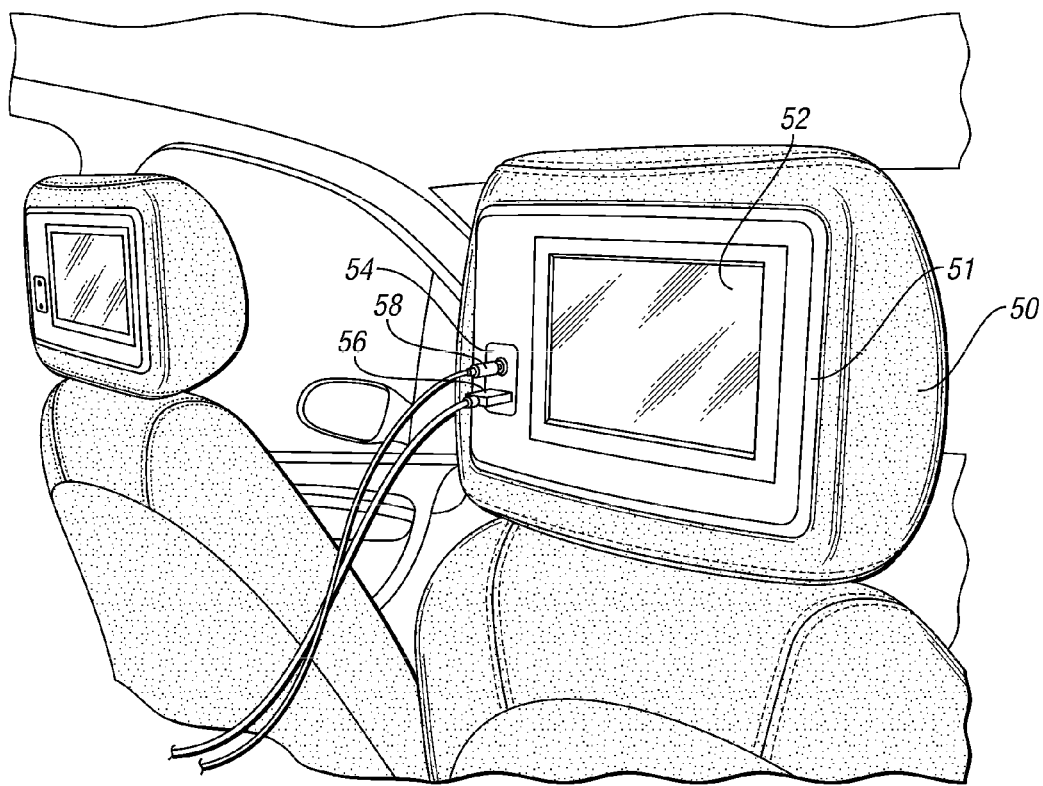
FIG. 2 shows an entertainment system coupled to the back of a vehicle seat.

In FIG. 2, a seat 50 has an entertainment system 51 mounted on the back of seat 50. Entertainment system 51 includes a video display 52, and an input/output panel 54. An input cable 56 from a game system, or other electronic device, is shown connected to input/output panel 54. A connector/cable 58 for earphones is shown plugged into input/output panel 54.

FIGS. 1 and 2 show an entertainment system including a video display. However, this is one non-limiting example. Alternatively, the entertainment system may include only audio output, either broadcast into the vehicle interior or through an audio jack.

Figure 3:
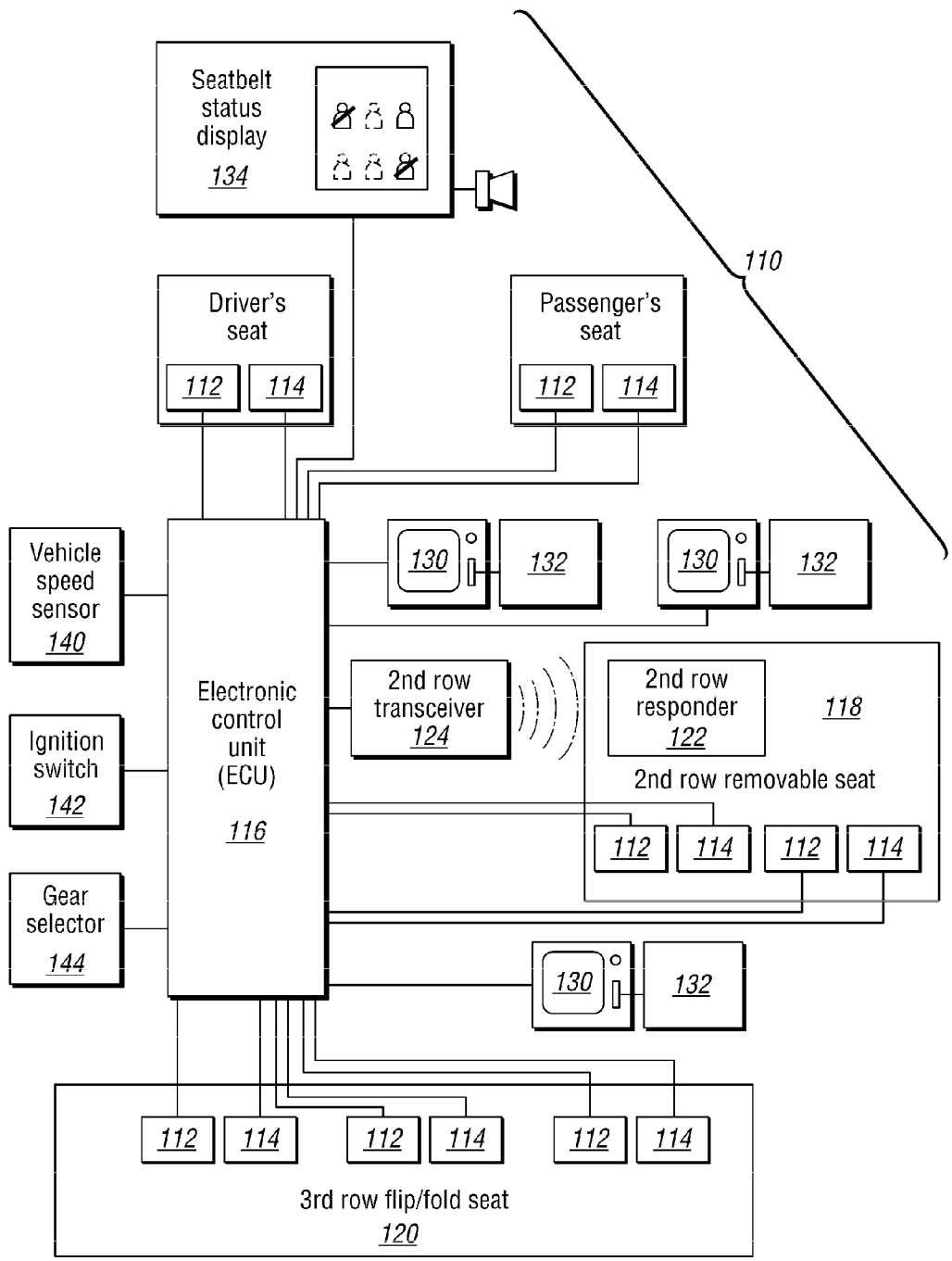
FIG. 3 is a schematic of a seatbelt usage promotion system illustrating embodiments of the disclosure.

Referring to FIG. 3, a seatbelt use promotion system 110 according to an embodiment of the disclosure is shown integrated with a vehicle restraint system. The seatbelt use promotion system 110 includes a plurality of seatbelt status sensors 112 associated with seatbelts provided for seats of the vehicle. Seatbelt status sensor 112 generates an electric signal from which it can be determined whether the seatbelt to which it is coupled is in a buckled or unbuckled condition. Seatbelt use promotion system also includes a plurality of seat occupancy sensors 114 associated with seats of the vehicle. Seat occupancy sensors 114 may comprise a weight sensor and/or a non-contact occupant sensor such as a capacitive, ultrasonic, infrared, or other appropriate sensor. Signals from sensors 112 and 114 are provided to an electronic control unit (ECU) 116 either directly or indirectly. For example, rear seatbelt use promotion system 110 as shown in FIG. 3 is adapted for use in a vehicle having a removable second row seat 118 and a non-removable third row seat 120, such as a flip/fold bench seat as is sometimes found in a minivan. Third row seat 120 is provided with seatbelt status sensors 112 and seat occupancy sensors 114 at three seating positions. Sensors 112 and 114 associated with third row seat 120 are hard-wired to ECU 116, as commonly known in the vehicle electrical system arts. Second row seat 118 is provided with seatbelt status sensors 112 and seat occupancy sensors 114 at two seating positions. Sensors 112 and 114 are coupled to ECU 116 wirelessly via transponder 122 and transceiver 124. The wireless transceiver 124/transponder 122 system allows the seats to be removed and reinstalled without the need to manually disconnect and reconnect conventional pin-and-socket electrical connectors. This obviates the need for a connector, reduces the likelihood of damage to the connectors that may be caused by misalignment during the mating process, and eliminates the problem of protecting the connectors against contamination by dirt or debris when the seat is removed. The example provided in FIG. 3, i.e., with second row seats 118 removable and provided with a wireless communication system, is not intended to be limiting. Any combination of fixed and removable seats is within the scope of the present disclosure. Furthermore, vehicles having fewer or more rows of seating and fewer or more seating positions per row are also within the scope of the present disclosure. ECU 116 is shown in FIG. 3 as a single unit. Alternatively, ECU 116 includes multiple units in which the computing is distributed among multiple ECUs. Seatbelt status sensors 112 may be buckle sensors that generate signals indicating whether the respective seatbelt buckle is fastened or unfastened. Buckle sensors may operate in any appropriate manner to detect whether the seatbelt latch plate (not shown) is fully inserted into the buckle (not shown). Alternatively, seatbelt status sensors 112 may cooperate with seatbelt reels or retractors (not shown) to detect whether the seatbelt is retracted, as is the case when the seatbelt is not in use, or paid out beyond a threshold length as is necessary to fasten the seatbelt around the body of a seat occupant.

In FIG. 3, three entertainment systems 130 are provided. Two entertainment systems 130 are provided proximate second row seat 118 for the use of second row occupants and one entertainment system is provided proximate third row seat 120 for third row occupants. In one embodiment, entertainment systems 130 include a video display and input/output ports. Attached to entertainment systems 130 are portable electronic devices 132. These may be game systems, MP3 players, portable DVD players, laptop computers, etc. A game system may have multiple controllers such that multiple occupants in one of the rows of seats play simultaneously on one unit possibly cooperatively or competitively.

ECU 116, in one embodiment, is a microprocessor-based device that monitors and interprets the signals from seatbelt status sensors 112 and seat occupancy sensors 114 to determine which seats are occupied and whether seatbelts in occupied seats are latched. Signals from seat occupancy sensors 114 can be evaluated in ECU 116 to also determine an occupant classification. According to an embodiment of the disclosure, discussed in more detail below, belt use promotion system 110 may respond differently depending on the class of occupant detected, e.g., adult, child, or infant in an infant safety seat.

A seatbelt status display 134 can be provided in a dash of the vehicle to provide a visual display of the status of rear passengers. Optionally, seatbelt status for the driver and front row passenger seats can also be included. An annunciator 136, for providing an audible signal to the vehicle occupants, can also be provided. The annunciator 136 may, for example, be a horn, buzzer or chime, or a speaker with an associated system for providing a recorded or synthesized voice warning, with the latter optionally capable of providing a targeted message indicating the seat location of concern and/or occupant classification.

A vehicle speed sensor 140 provides a signal to ECU 116 from which vehicle speed can be estimated. Also, ECU 116 is electronically coupled to an ignition switch 142 from which key-on and key-off positions can be determined. ECU 116 is also coupled to a gear selector 144 so that transmission gear status can be determined. Actions by seatbelt use promotion system 110 are based on whether an occupied seat has an associated unbuckled seatbelt. Optionally, the determination can be further based on status of ignition switch 142, with seatbelt use promotion actions occurring when the ignition switch is in a key-on position and not occurring when the ignition switch is in a key-off position. Additionally or alternatively, seatbelt promotion actions are based on vehicle speed being greater than a predetermined threshold speed, such as 2 m.p.h. Additionally or alternatively, seatbelt promotion actions are based on gear selector 144 being in a drive condition, i.e., any forward or reverse gear. This embodiment applies to a vehicle with an automatic transmission.

Figure 4:
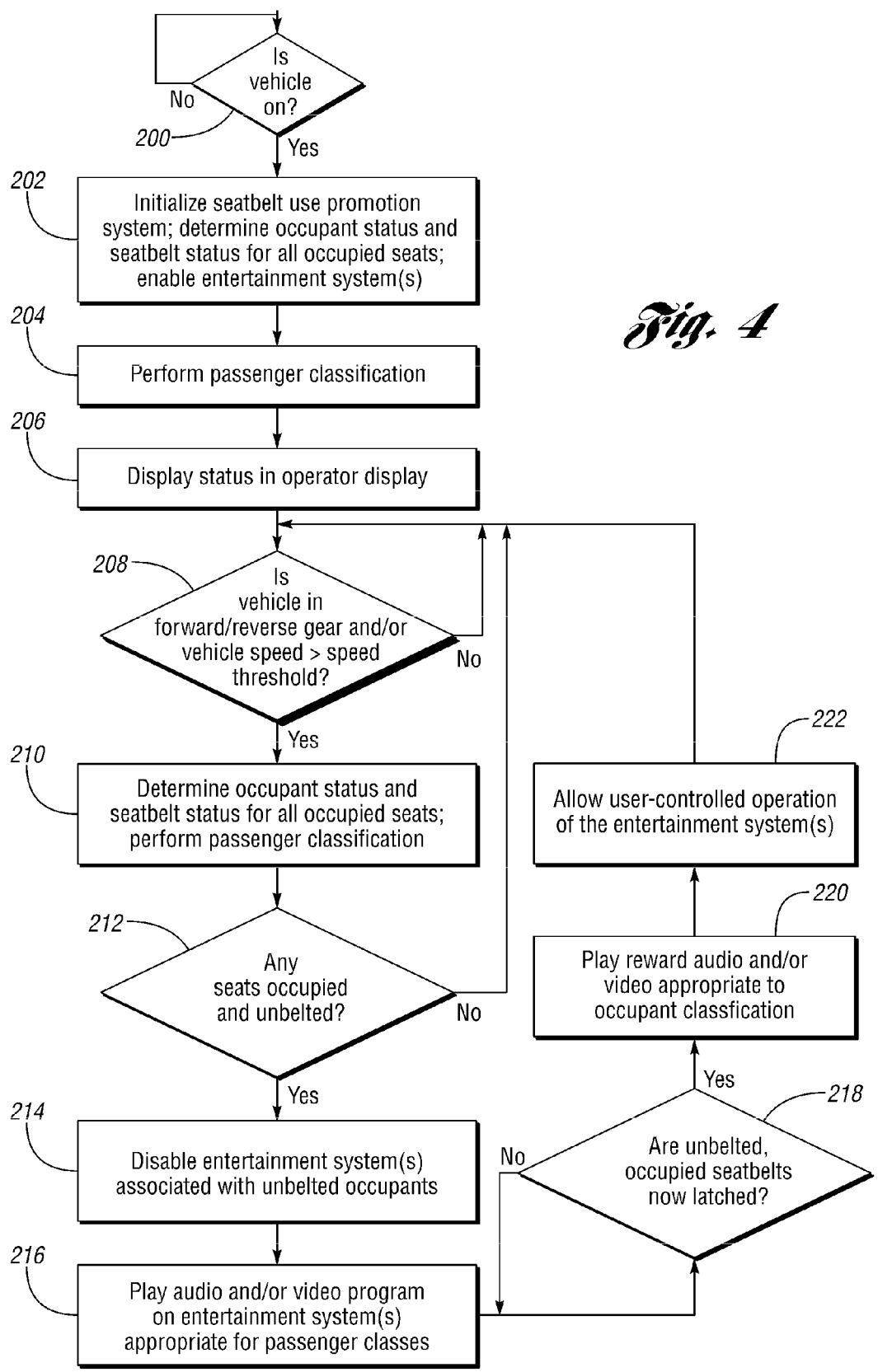
FIG. 4 is a flowchart of a seatbelt usage promotion system illustrating embodiments of the disclosure.

In FIG. 4, a flowchart of one embodiment of the disclosure is shown. In 200, it is determined whether the vehicle is on. This can be based on the position of the ignition switch, in one embodiment. Alternatively, this can be based on the engine rotating. Control passes to 202 when the vehicle is considered to be "on." In 202, seatbelt use promotion system 110 is initialized. The occupant status of the seats and the seatbelt status for occupied seats are both determined in 202. Also, the entertainment system(s) are enabled. Based on a signal from the seat sensor or other sensor, a passenger classification routine can be performed in 204. In one embodiment, a weight of the passenger is determined. Depending on the weight, the passenger is classified as a child or an adult. Additionally, it is useful to identify seats occupied by child infant seats. Some infant seats couple to anchors specifically provided in the seats to secure infant seats. The infant seats have their own retention systems. Thus, in seats in which infant seats are coupled, the seatbelts may not be employed regardless of whether an infant is in the seat or not. In one embodiment, the seatbelt use promotion system can be manually disabled in seats in which infant seats are secured. This capability can be particularly useful when the occupant detection system incorrectly identifies the infant seat as an occupant. In 206, the occupant status and seatbelt status of occupied seats is displayed in an operator display. In one embodiment, the occupant classification is also displayed to the operator. It may be useful to display to the operator of the vehicle the status of the passengers and their seatbelts prior to driving off so that the vehicle operator can take measures to rectify the matter before putting the vehicle into drive and driving off.

Control passes to 208 of FIG. 4 in which it is determined, according to one embodiment, whether the vehicle is in a forward or reverse gear, i.e, can move in either direction. In an alternative embodiment, in 208, it is determined whether the actual vehicle speed is greater than a speed threshold. Either one of the tests or both of the tests can be employed in 208. Control passes through 208 to 210 when one or both of the conditions in 208 are true, depending on the embodiment. In 210, occupant status, seatbelt status, and optionally passenger classification are again determined. A passenger that had not already buckled when checked in block 202 may have since latched or unlatched their seatbelt. Control passes to 212 in which it is determined whether any occupied seats have unlatched seatbelts. If not, control passes back to 208 and the tests in 208 and 212 are repeatedly conducted to detect a passenger that unbuckles during operation of the vehicle.

If a positive result in block 212, control passes to block 214 in which the entertainment system or entertainment systems associated with unbelted occupants is disabled. In embodiments with one entertainment system, the sole entertainment system is disabled. In embodiments with multiple entertainment systems, only those entertainment systems that can be enjoyed by an unbelted occupant are disabled. For example, if an entertainment system suspended from the roof can be viewed by both 2nd and 3rd row passengers, then any passenger in 2nd or 3rd row seats leads to disabling the entertainment system 214. The term "associated with" in 214 refers to an entertainment system that can be enjoyed or viewed, if a video display, by an unbelted occupant. In one embodiment having a video entertainment system for 3rd row passengers, the entertainment system may not be disabled if a 2nd row passenger were determined to have an unbuckled seatbelt. Control passes to 216 in which an audio and/or video program is played on the entertainment systems(s) that were disabled in block 214. In one embodiment, a video is shown illustrating how to properly fasten the seatbelt. In another embodiment, an audio clip is played on the entertainment system describing the fault and indicating that the entertainment system is blocked until the unbelted passenger properly latches the seatbelt. According to one embodiment, the display on the entertainment system selected for display is based on the occupant classification, i.e., different for a child than an adult. Control passes to block 218 in which it is determined whether the formerly unbelted passenger has now latched their belt. Control does not pass beyond 218 until a positive result passes control to 220. In 220, a reward audio and/or video clip can be played, depending on the occupant classification. For example, for a child, a message stating "good job" or a video showing a pleasing character or exciting scene can be played as a reward for latching the seatbelt. This is an optional feature in one embodiment. Control passes to 222 in which user-control of the entertainment system is enabled. Control returns to 208 so that the tests of the vehicle being in gear and/or moving at a speed exceeding the threshold 208 and seatbelt usage 212 are continually monitored.

The flowchart in FIG. 4 characterizes several alternative embodiments of the disclosure. In addition to the embodiments described above, many more embodiments are reflected in FIG. 4. For example, some of the blocks in FIG. 4 are optional. Also, the order in which the blocks are be performed in FIG. 4 constitute one alternative. Some of the blocks can be performed according to an alternative order without departing from the scope of the disclosure. Also, as described in relation to block 214, entertainment system(s) are disabled that are associated with one or more unbelted occupant. Blocks 214 and the successive blocks, in one embodiment, is reproduced for each entertainment system. For example, in embodiments with multiple entertainment systems, a 3rd row passenger with an unbuckled belt may disable both a 3rd row and a 2nd row entertainment system. If the 2nd row entertainment system were not disabled, then the 3rd row passenger may not be encouraged to buckle their belt because they may be satisfied by watching, listening to, or participating with the 2nd row entertainment system. The intent is to deny any entertainment system to an unbelted occupant to encourage seatbelt usage.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A method to encourage seatbelt use, the method comprising:
   determining whether a seat is occupied;
   determining an age classification of an occupant of the seat;
   determining whether a seatbelt associated with the seat is buckled;
   overriding of a user-controlled operation of an entertainment system associated with the seat when the seat is occupied and the seatbelt is unbuckled;
   providing a message on the entertainment system, the message based on the age classification of the occupant; and
   allowing user-controlled operation of the entertainment system when it has been determined that the seatbelt is buckled.

2. The method of claim 1 wherein the seat is coupled to an automotive vehicle and the overriding of the user-controlled operation of the entertainment system is further based on the automotive vehicle traveling above a predetermined threshold speed.

3. The method of claim 1 wherein the seat is coupled to an automotive vehicle and the overriding of the user-controlled operation of the entertainment system is further based on an ignition of the automotive vehicle being in an on position.

4. The method of claim 1, further comprising:
providing a rewarding output on the entertainment system when it has been determined that the seatbelt is buckled, wherein the rewarding output provided is based on the age classification of the occupant.

5. The method of claim 1 wherein the seat, the seatbelt, and the entertainment system are integrated into an automotive vehicle.

6. The method of claim 1 wherein:
the entertainment system is integrated into a vehicle and comprises a video display and input ports, with the input ports adapted to couple with a portable, user-provided electronic device; and
the overriding of the user-controlled operation comprises disallowing output from the portable, user-provided electronic device from displaying on the video display.

7. The method of claim 1 wherein the seat is a first seat and the seatbelt is a first seatbelt, the method further comprising:
determining whether a second seat is occupied, the second seat also being associated with the entertainment system; and
determining whether a second seatbelt associated with the second seat is buckled, wherein the overriding of the user-controlled operation of the entertainment system is based on one of:
the first seat being occupied and the first seatbelt being unbuckled; and
the second seat being occupied and the second seatbelt being unbuckled.

8. The method of claim 1 wherein the age classification of the occupant is determined by detecting a weight of the occupant.

9. The method of claim 1 wherein the entertainment system is deemed to be associated with the seat when a person occupying the seat is able to benefit from the entertainment system.

10. The method of claim 9 wherein the entertainment system includes a video display and the person occupying the seat is in a position to view the video display.

11. A seatbelt use promotion system in a vehicle, the system comprising:
a seat having an associated seatbelt and an associated occupancy sensor;
an entertainment device coupled to the vehicle and associated with the seat; and
an electronic control unit (ECU) electronically coupled to the occupancy sensor, the seatbelt, and the entertainment device, the ECU disabling control of the entertainment device by an occupant of the seat when the ECU determines that the occupant is in the seat and the seatbelt is unbuckled, the ECU determining an age classification of the occupant based upon a signal from the associated occupancy sensor, and the ECU commanding a message on the entertainment system, the message directed at the occupant and based on the age classification of the occupant.

12. The system of claim 11 wherein the seatbelt is coupled to the vehicle, the seatbelt has a spring-loaded retraction system, the ECU determines that the seat is occupied based on a signal from the occupancy sensor and determines that the seatbelt is unbuckled based on an amount of payout of a belt portion of the seatbelt with respect to the spring-loaded retraction system.

13. The system of claim 11 wherein the seatbelt use promotion video comprises an instructional video on buckling the seatbelt.

14. The system of claim 11, further comprising:
a vehicle speed sensor electronically coupled to the ECU, wherein the ECU further bases the disabling of occupant control of the entertainment device on when the ECU also determines that a vehicle speed is greater than a predetermined threshold speed.

15. The system of claim 11 wherein the entertainment system comprises a video display integrated with the vehicle and the message commanded by the ECU is a seatbelt use promotion video to be played on the video display.

16. The system of claim 15 wherein the age classification determined by the ECU is based upon an approximate weight of the occupant detected by the occupancy sensor.

17. A method to encourage seatbelt use, the method comprising:
operating a seat occupancy sensor to determining that a seat is occupied by an occupant;
determining an age classification of the occupant based upon at least one of an estimated weight of the occupant and an estimated size of the occupant;
determining that a seatbelt associated with the seat is unbuckled;
overriding user-controlled operation of an entertainment system associated with the seat when the seat is occupied and the seatbelt is unbuckled;
displaying a seatbelt use promotion video on a video display associated with the entertainment system, the seatbelt use promotion video being based on the age classification of the occupant;
providing a rewarding output on the entertainment system when it has been determined that the seatbelt is buckled, the rewarding output being based on the age classification of the occupant; and
allowing the user-controlled operation of the entertainment system after the rewarding output has been provided.

* * * * *